US012729855B2

(12) United States Patent
Vaccari et al.

(10) Patent No.: US 12,729,855 B2
(45) Date of Patent: Sep. 8, 2026

(54) METHOD AND KILN FOR THE FIRING OF SUBSTANTIALLY FLAT BASE CERAMIC ARTICLES

(71) Applicant: SACMI FORNI & FILTER S.P.A., Imola (IT)

(72) Inventors: Pier Francesco Vaccari, Casalgrande (IT); Alberto Toro, Casalgrande (IT)

(73) Assignee: SACMI FORNI & FILTER S.P.A., Imola (IT)

( * ) Notice: Subject to any disclaimer, the term of this patent is extended or adjusted under 35 U.S.C. 154(b) by 352 days.

(21) Appl. No.: 18/691,034

(22) PCT Filed: Sep. 16, 2022

(86) PCT No.: PCT/IB2022/058749
§ 371 (c)(1),
(2) Date: Mar. 11, 2024

(87) PCT Pub. No.: WO2023/042132
PCT Pub. Date: Mar. 23, 2023

(65) Prior Publication Data
US 2024/0369223 A1 Nov. 7, 2024

(30) Foreign Application Priority Data
Sep. 16, 2021 (IT) ........................ 102021000023858

(51) Int. Cl.
*F23N 5/18* (2006.01)
*F23N 1/02* (2006.01)
(Continued)

(52) U.S. Cl.
CPC ............ *F23N 1/022* (2013.01); *F23N 5/102* (2013.01); *F23N 5/184* (2013.01); *F27B 9/02* (2013.01);
(Continued)

(58) Field of Classification Search
CPC .......... F23N 1/022; F23N 5/102; F23N 5/184; F23N 2221/10; F23N 2237/08;
(Continued)

(56) References Cited

U.S. PATENT DOCUMENTS

2003/0000574 A1 1/2003 Cordier et al.
2006/0068346 A1* 3/2006 Nowakowski .......... F23C 6/045 431/174

FOREIGN PATENT DOCUMENTS

DE 102019101190 A1 7/2020
DE 102019131346 A1 * 5/2021 ............. F23N 1/022
(Continued)

OTHER PUBLICATIONS

International Search Report and Written Opinion received for PCT Application No. PCT/IB2022/058749, mailed on Dec. 5, 2022.
(Continued)

*Primary Examiner* — Avinash A Savani
(74) *Attorney, Agent, or Firm* — Workman Nydegger

(57) ABSTRACT

Method and kiln for the firing of base ceramic articles (BC) comprising: a firing chamber inside which the base ceramic articles (BC) to be fired are conveyed; at least one burner for burning a combustion mixture to heat the firing chamber and to fire the base ceramic articles (BC); first and second feeding device for feeding, respectively, a fuel mixture and an oxidizer to the burner; an identification unit configured to assess the type of fuel mixture and a control assembly which is configured to activate the feeding device and/or the second feeding device depending on the temperature detected in the firing chamber, and to adjust the activation of the second feeding device depending on the type of fuel mixture and on the flow rate of the fuel mixture and on the flow rate of the oxidizer.

16 Claims, 3 Drawing Sheets

(51) Int. Cl.
*F23N 5/10* (2006.01)
*F27B 9/02* (2006.01)
*F27B 9/24* (2006.01)

(52) U.S. Cl.
CPC ...... *F27B 9/2407* (2013.01); *F23N 2005/181* (2013.01); *F23N 2005/185* (2013.01); *F23N 2221/10* (2020.01); *F23N 2237/08* (2020.01)

(58) Field of Classification Search
CPC .... F23N 200/181; F23N 200/185; F27B 9/02; F27B 9/2407
USPC ............................................................ 431/12
See application file for complete search history.

(56) References Cited

FOREIGN PATENT DOCUMENTS

| | | | |
|---|---|---|---|
| EP | 3767214 | A1 | 1/2021 |
| RU | 2733602 | C1 | 10/2020 |

OTHER PUBLICATIONS

Office Action received for RU Patent Application No. 2024106505, mailed on Sep. 30, 2024, 6 pages.

* cited by examiner

METHOD AND KILN FOR THE FIRING OF SUBSTANTIALLY FLAT BASE CERAMIC ARTICLES

CROSS-REFERENCE TO RELATED APPLICATIONS

The present invention is a 35 U.S.C. § 371 U.S. National Stage of PCT Application No. PCT/IB2022/058749, filed on Sep. 16, 2022, which claims priority from Italian Patent Application No. 102021000023858 filed on Sep. 16, 2021. The content of each of the aforementioned patent applications is incorporated herein by reference.

FIELD OF THE ART

The present invention relates to a method and a kiln for the firing of substantially flat base ceramic articles. In particular, the present invention finds advantageous application in the firing of base ceramic articles to obtain ceramic products, in particular ceramic slabs, even more particularly tiles, to which the following description will explicitly refer without thereby losing in generality.

BACKGROUND OF THE INVENTION

In the field of production of the ceramic slabs, in particular of the tiles, it is known to fire at a high temperature the base ceramic article, obtained by pressing a semi-dry mixture (possibly followed by a decoration step), inside a kiln, typically of the tunnel type.

A kiln for the firing of base ceramic articles is normally divided into a preheating zone, a real firing zone and a cooling zone, located downstream of the firing zone, to reduce the temperature of the base ceramic articles coming from the firing zone itself. The base ceramic articles pass through the different zones of the kiln transported by a conveyor device that develops along a given path through the kiln itself.

Usually, the kiln comprises a plurality of burners organised into assemblies of burners, to heat at least the firing zone in order to fire the base ceramic articles passing inside it and to obtain ceramic slabs, in particular tiles. Each burner comprises a mixing body, in which a predefined quantity (flow rate) of fuel mixture (e.g. methane gas) and a predefined quantity (flow rate) of oxidizer (typically ambient air having approx. 21% oxygen) are mixed together to generate a combustion mixture, and a combustion chamber in which the combustion mixture itself is burnt in order to heat the firing zone. A kiln of the known type therefore comprises: a fuel mixture feeding device and an oxidizer feeding device for feeding, respectively, the fuel mixture and the oxidizer towards each assembly of burners (or to each burner of the plurality of burners).

To obtain an optimal firing of the base ceramic articles in a kiln like the one described above, it is important to precisely control the firing conditions, and in particular the firing temperature. In fact, a firing of the ceramic articles under sub-optimal conditions, for example at too low or too high a firing temperature, inevitably results in defects in the final ceramic products (i.e. in the ceramic slabs, and in particular in the tiles), such as for example defects in shape, like the lack of flatness, or defects in colour or brightness. This results in an increase in production waste.

An important role in the quality of the final ceramic products is also played by the volume ratio between the oxidizer and the fuel mixture. For example, in the presence of higher or lower percentages of oxygen (more or less oxidising environment) different chromatic effects can be obtained.

In this context, it is appropriate to identify, for each final ceramic product to be made, the optimal firing temperature and the volume ratio between the oxidizer and the optimal fuel mixture and to apply these conditions whenever it is desired to obtain a given final ceramic product.

However, in the known kilns, adjusting the volume ratio between the oxidizer and the fuel mixture in the combustion mixture is a fairly complex operation that is performed manually and which requires the intervention of a skilled person who acts on the fuel mixture feeding device and on the oxidizer feeding device so as to modify the quantity (flow rate) of the fuel mixture and/or of the oxidizer fed towards the burner (or towards each burner of the plurality of burners). In detail, the skilled person during such adjustment must act on adjustment valves arranged, respectively, along a fuel mixture feeding duct and along an oxidizer feeding duct and connected to each other (typically mechanically via a lever-type connection) so that the adjusting (i.e. variation of the opening) of the adjustment valve of the fuel mixture feeding device results in a consequent adjustment (i.e. variation of the opening) of the adjustment valve of the oxidizer feeding device.

Other known kilns, on the other hand, provide for a pneumatic adjustment of the adjustment valves.

From the above, it is evident that these systems, while allowing to maintain (as the absolute quantity of the fuel mixture fed to the burners varies) the ratio between fuel mixture and oxidizer substantially constant, require very complex manual adjustments whenever, for any reason (for example because the type of ceramic product to be treated changes or because the type of treatment to be performed on the ceramic product changes or because the inflow of base ceramic articles to the kiln ceases), it is desired to change the firing conditions. This entails production downtimes, with considerable disadvantages in terms of production times and costs, plus all the problems in terms of precision and replicability of the manual work operations.

In an attempt to remedy these problems, kilns and methods for the firing of ceramic articles have been developed in recent years that allow for an automatic adjustment of the flow rate of the fuel mixture and/or of the oxidizer fed to the kiln as the temperature detected inside the firing chamber and the quantity of fuel mixture and/or of oxidizer actually fed to the burners change. A kiln and method for the firing of ceramic articles of this type is, for example, described in the same Applicant's document EP3767214.

Such kilns and methods for the firing of ceramic articles are, however, designed to operate with a certain fuel, typically formed by methane or LPG; in other words, the measuring systems and the adjustment systems provided in these kilns and the methods for firing the ceramic articles are initially set (set up) with certain initial data about the fuel and the oxidizer, on the basis of which the subsequent adjustments take place.

However, in recent times, mainly for environmental and eco-sustainability reasons, but also due to the availability of oxidizers, the use of different types of fuel mixtures, comprising one or more fuels, is being considered. For example, some of these fuel mixtures comprise hydrogen, to be used, in certain areas of the kiln or for certain periods, in place of traditional fuels (such as methane gas and LPG), or together with them, that is, by feeding the aforementioned burners with a fuel mixture, in these cases we speak about kilns with variable composition fuel.

It is evident that a limit in the use of variable composition fuel mixtures is represented precisely by the difficulty in obtaining, as the composition of the fuel mixture varies, optimal firing conditions, in terms of value and homogeneity of firing temperature, but also of oxygenation, etc. This makes such a solution hardly feasible today, except by accepting to work, in some cases (i.e. for certain compositions of the fuel mixture), under sub-optimal conditions, with consequent increase in the firing defects in the ceramic products and therefore increase in waste, or by performing difficult manual adjustment operations, whenever the composition of the fuel mixture changes, with all the disadvantages mentioned above.

DISCLOSURE OF THE INVENTION

Aim of the present invention is to provide a method and a kiln for the firing of base ceramic articles, which overcome, at least partially, the drawbacks of the prior art and are, at the same time, easy and inexpensive to manufacture.

In accordance with the present invention, there are provided a method and a kiln for the firing of base ceramic articles as claimed in the independent claims below and, preferably, in any of the claims dependent directly or indirectly on the independent claims.

The claims describe preferred embodiments of the present invention.

BRIEF DESCRIPTION OF THE DRAWINGS

The present invention will now be described with reference to the accompanying drawings, showing some not limiting embodiments thereof, wherein.

PREFERRED EMBODIMENTS OF THE INVENTION

Figure 1:
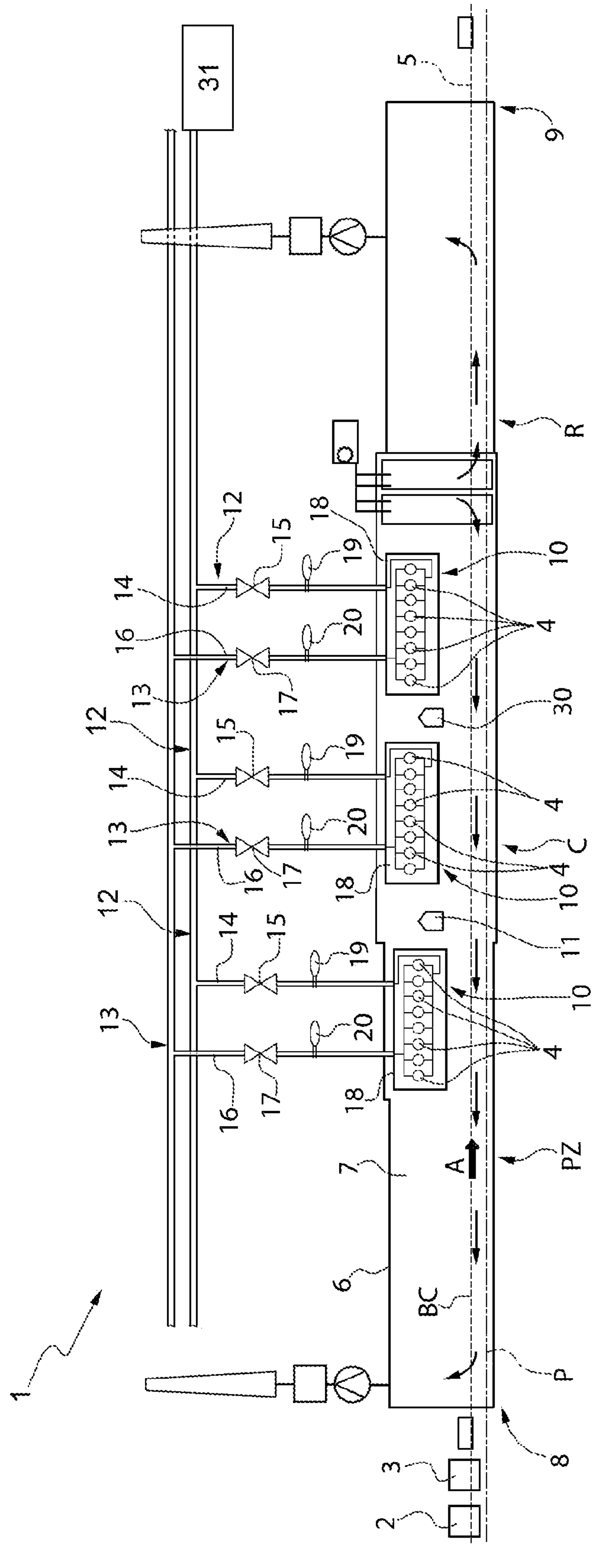
FIG. 1 is a schematic and side view of part of a kiln for the firing of base ceramic articles in accordance with the present invention.
Figure 2:
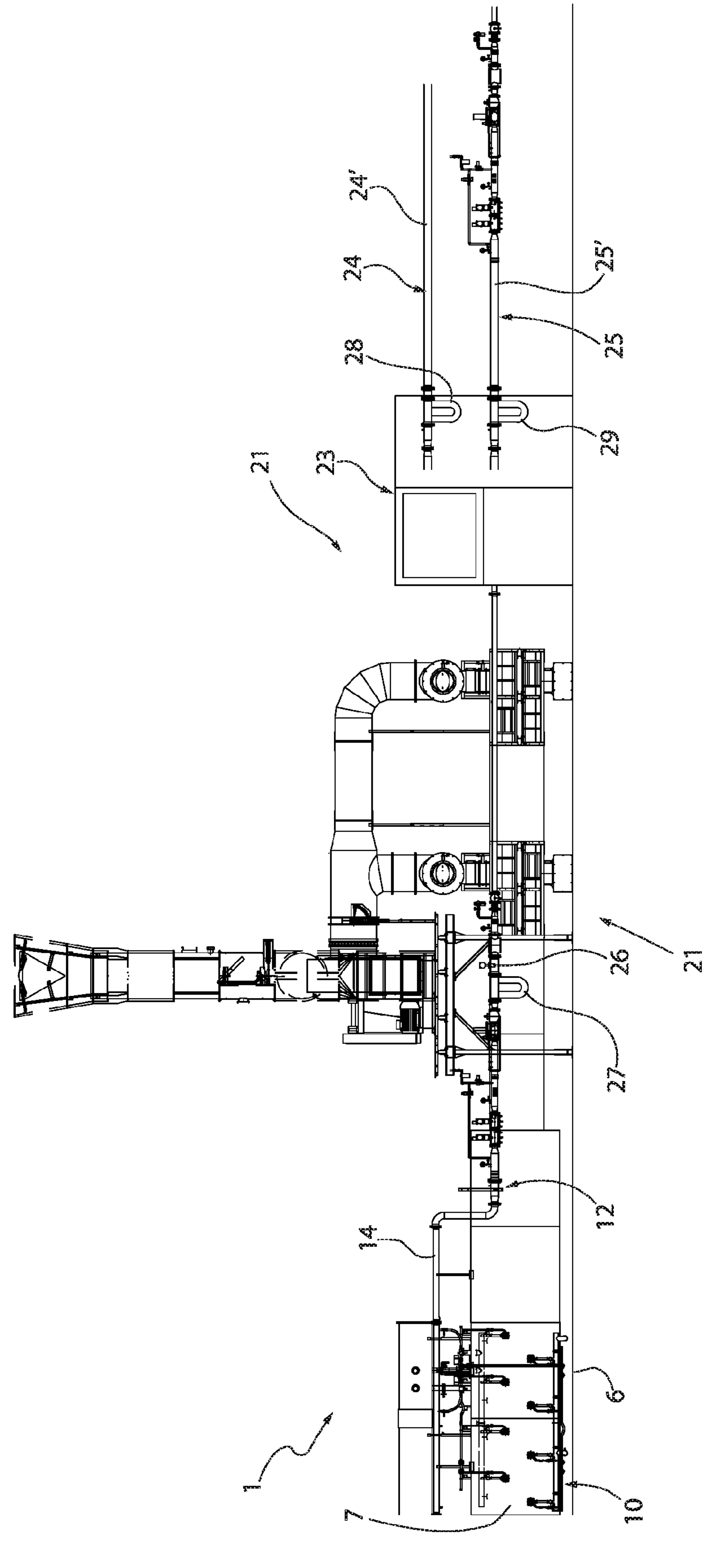
FIG. 2 is a side and enlarged scale view of a part of the kiln of FIG. 1.

In FIGS. 1 and 2, 1 denotes as a whole a kiln for the firing of substantially flat base ceramic articles BC. In particular, the present discussion will make particular reference to the firing of substantially (but not necessarily) flat base ceramic articles BC to obtain final ceramic products PC, more particularly ceramic slabs, more precisely tiles.

The substantially (but not necessarily) flat base ceramic articles BC are generally obtained by pressing, by means of a pressing apparatus 2 (per se known, not further described and schematically shown in FIG. 1) for pressing a ceramic powder (a semi-dry mixture, in particular having a humidity content ranging from 5% to 7%) mainly based on silica (at least about 35% —in particular at least about 40%—by weight with respect to the total weight of the silica base ceramic articles BC) and having less than about 50% (in particular less than about 30%) by weight, with respect to the total weight of the alumina base ceramic articles BC. According to some not limiting embodiments, the base ceramic articles BC comprise up to about 80% by weight, with respect to the total weight of the base ceramic articles BC, made of silica. Typically, the base ceramic articles BC comprise additional inorganic oxides such as Magnesium, Zirconium Sodium and Potassium oxides. For example, a generic mixture for a common porcelain stoneware has: about 10÷25 by weight with respect to the total weight of the illitic clay mixture; about 25÷55% by weight with respect to the total weight of the kaolinitic clay mixture; about 25÷45% by weight with respect to the total weight of the Feldspar mixture; up to a maximum of about 10% by weight with respect to the total weight of the Kaolin mixture; up to a maximum of about 10% by weight with respect to the total weight of the quartz sand mixture; and up to a maximum of about 5% by weight with respect to the total weight of the mixture of complementary materials (e.g. Dolomite).

Advantageously but not necessarily, the base ceramic articles BC are decorated by means of a decorating device 3 (per se known, here not further described and schematically shown in FIG. 1), placed upstream of the kiln 1, before being conveyed, by means of a conveyor device 5, inside the kiln 1 itself where the base ceramic articles BC are fired.

The conveyor device 5, schematically shown in FIG. 1 with a hatch, is configured to convey the base ceramic articles BC along a given path P (in a direction A of advancement).

According to some not limiting and not shown embodiments, the conveyor device 5 comprises a plurality of ceramic rollers (possibly moved at different speeds to differentiate the firing of the artefacts).

Advantageously but not necessarily, the kiln 1 (which, in particular, is a roller kiln and) comprises a (substantially flat) side wall 6 that delimits a firing chamber 7 that has an input station 8 (through which, in use, the base ceramic articles BC enter the firing chamber 7) and an output station 9 through which, in use, the final ceramic products CP (in particular, the ceramic slabs or the tiles) exit the firing chamber 7. In particular, the given path P, along which the base ceramic articles BC are advanced, extends from the input station 8 to the output station 9. More precisely, according to the not limiting embodiment shown in FIG. 1, the path P extends starting from the pressing apparatus 2, through the decorating device 3 and through the firing chamber 7 (between the input station 8 and the output station 9).

Advantageously but not necessarily, the firing chamber 7 is divided into a preheating zone PZ, a real firing zone C and a cooling zone R, located downstream of the firing zone C, to reduce the temperature of the base ceramic articles BC before they exit the kiln 1 itself.

Advantageously but not in a limiting way, the firing chamber 7 is at least about 40 m long, in particular at least about 60 m, more particularly at least 130 m (even more particularly, up to about 600 m).

The kiln 1 further comprises at least one burner 4, advantageously a plurality of burners 4 (which, in particular, are placed above and below, or only above, or only below the given path P) to burn a combustion mixture so as to heat the firing chamber 7 (in particular, the zones PZ and C) and fire the base ceramic articles BC while passing inside the firing chamber 7 itself and obtain the final ceramic products PC (in particular, ceramic slabs; even more particularly, tiles).

In particular, according to the not limiting embodiment shown in FIG. 2, the kiln 1 comprises a plurality of burners 4 organised into a plurality of assemblies 10 of burners 4 (in this case eight burners 4), in particular placed above and below, or only above, or only below the given path P.

Advantageously but not necessarily, each burner 4 comprises a mixing body (not shown) in which a fuel mixture (represented in FIG. 3 by an arrow AA), comprising at least one first fuel (e.g. methane gas), and an oxidizer (represented in FIG. 3 by another arrow AB), typically ambient air with about 21% oxygen, are mixed to obtain the combustion mixture, and a combustion chamber (not shown) in which the combustion mixture (once ignited so as to obtain a flame) is burned, so as to fire the base ceramic articles BC (passing them from an initial temperature) at a firing temperature of at least about 500° C. (in particular at least about 900° C., more particularly at least about 1200° C.).

According to some not limiting embodiments, the kiln 1 is configured so that the temperature inside the firing chamber 7 (more precisely, the firing zone C) is at most about 1400° C. (in particular, at most about 1300° C.).

In particular, advantageously, the kiln 1 comprises at least one detection device 11 which is configured to detect the temperature inside the firing chamber 7. In detail, when we talk about the temperature of the firing chamber 7 (i.e. inside the firing chamber 7; more precisely, of the firing zone C) we refer to the temperature inside said firing chamber 7, that is to say the temperature measured by said detection device 11 which is configured to detect the temperature inside the firing chamber 7 (more precisely, of the firing zone C), for example with a suitable sensor, such as a thermocouple. Advantageously but not necessarily, the detection device 11 is placed inside the firing chamber 7.

The kiln 1 further comprises (at least) a fuel mixture feeding device 12 configured to feed the aforementioned fuel mixture, which comprises at least one first fuel, towards the burner 4 (or towards each assembly 10 of burners 4) and (at least) an oxidizer feeding device 13 configured to feed the oxidizer towards the burner 4 (or towards each assembly 10 of burners 4).

In accordance with some advantageous but not limiting embodiments such as the one shown in FIG. 1, the kiln 1 comprises at least one feeding device 12 (in this case a plurality of feeding devices 12—for example three feeding devices 12, as shown in FIG. 1—each) configured to feed the fuel mixture towards (to) a burner 4 or, more precisely, to an assembly of burners 10 4 of the plurality of assemblies 10 of burners 4.

Advantageously but not necessarily, the (each) fuel mixture feeding device 12 comprises (is constituted by at least) a fuel mixture feeding duct 14, fluidically connected to the burner 4 (or to each assembly 10 of burners 4) and an adjustment valve 15 (in particular, electrically operated), advantageously arranged along the fuel mixture feeding duct 14 (in particular, upstream of the burner 4—or of each assembly 10 of burners 4) and activable (appropriately openable) to adjust the quantity (the flow rate—that is, the quantity by weight in the unit of time) of the fuel mixture to be circulated along the fuel mixture feeding duct 14, so as to adjust the quantity (flow rate) of the fuel mixture to be fed to the burner 4 (or to each assembly 10 of burners 4), and therefore the quantity (flow rate) of the fuel mixture comprised in the combustion mixture.

Similarly, in accordance with some not limiting embodiments such as the one shown in FIG. 1, the kiln 1 comprises a plurality of (in this case three) oxidizer feeding devices 13, each configured to feed the oxidizer towards (to) a burner 4 or, more precisely, towards (to) an assembly 10 of burners 4 of the plurality of assemblies 10 of burners 4.

Advantageously but not necessarily, the (each) oxidizer feeding device 13 comprises (in particular, is constituted by at least) an oxidizer feeding duct 16, fluidically connected to the burner 4 (or to each assembly 10 of burners 4) and adjustment valve 17, advantageously electrically operated, and advantageously arranged along the oxidizer feeding duct 16 (in particular, upstream of the burner 4—or of each assembly 10 of burners 4) and activable (i.e. appropriately openable) to adjust the quantity (flow rate) of the oxidizer to be circulated along the oxidizer feeding duct 16, so as to adjust the quantity (flow rate) of the oxidizer to be fed to the burner 4 (or to each assembly 10 of burners 4) and thus the quantity (flow rate) of the oxidizer which together with the fuel mixture fed by the fuel feeding device 12 constitutes the combustion mixture.

According to some advantageous but not limiting embodiments (such as the one shown in FIGS. 1 and 3), the fuel mixture feeding duct 14 and the oxidizer feeding duct 16 comprise branches 18 (schematically shown in FIGS. 1 and 3) for feeding, respectively, the fuel mixture and the oxidizer to each assembly 10 of burners 4 towards the individual burners 4.

Advantageously but not necessarily, each burner 4 (more precisely, each assembly 10 of burners 4) is arranged (in the firing chamber 7) above the conveyor device 5 to transfer the heat to the base ceramic articles BC as they pass through the firing chamber 7 along the given path P.

Figure 3:
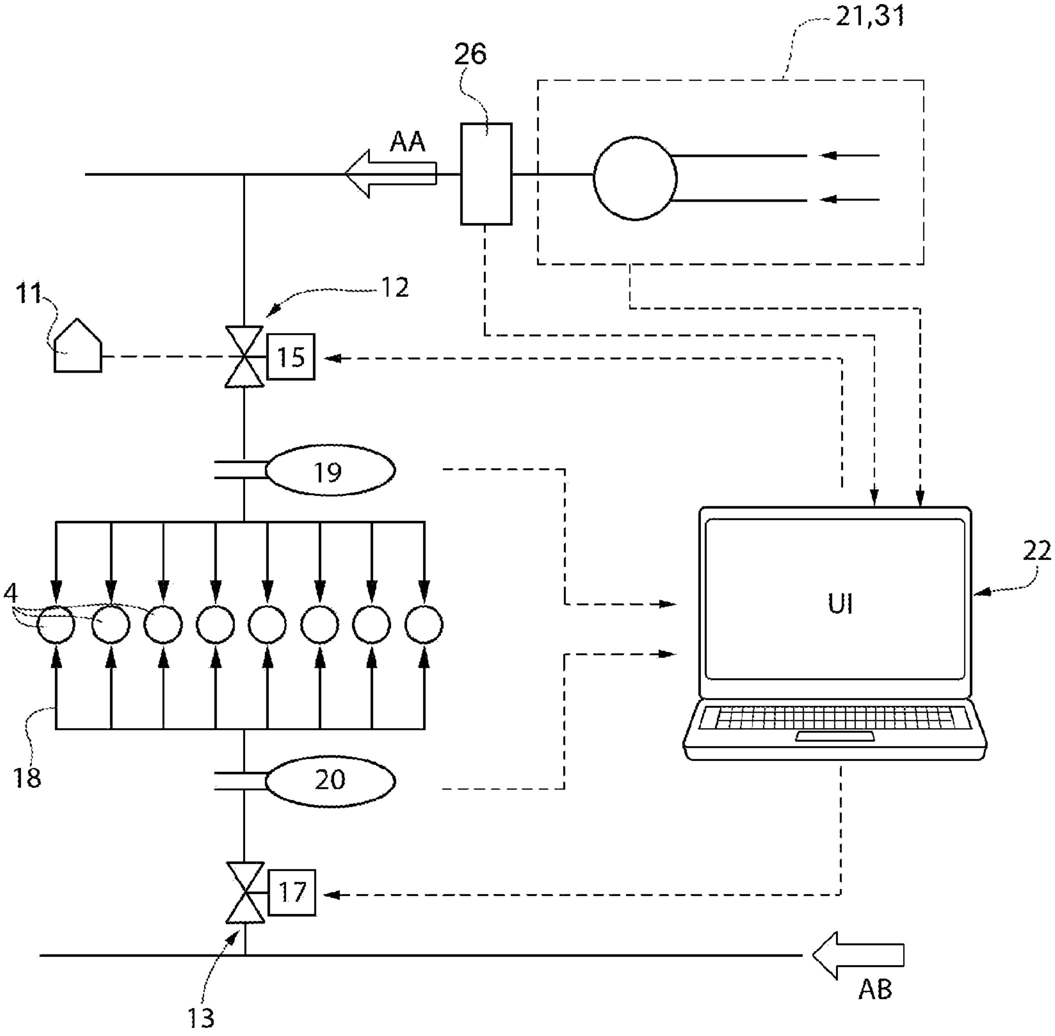
FIG. 3 is a schematic and enlarged scale representation of part of the kiln of FIG. 1.

The kiln 1 further comprises a flow rate measuring device 19 which is configured to estimate the flow rate of the fuel mixture fed to the burner 4 (or to each assembly 10 of burners 4) by (or following the activation of) the fuel feeding device 12; in other words, the flow rate measuring device 19 is configured to estimate the flow rate of the fuel mixture that passes through the fuel mixture feeding duct 14, following the activation of the feeding device 12, and in particular the activation of the adjustment valve 15 (see FIGS. 1 and 3).

Advantageously but not in a limiting way, the kiln 1 (also) comprises a second flow rate measuring device 20 configured to estimate the flow rate of the oxidizer fed to the burner 4 (or to each assembly 10 of burners 4) by (or following the activation of) the oxidizer feeding device 13; in other words, the flow rate measuring device 20 is configured to estimate the flow rate of the fuel mixture that passes through the fuel mixture feeding duct 16, following the activation of the feeding device 13, and in particular the activation of the adjustment valve 17 (see FIGS. 1 and 3).

Further, the kiln 1 comprises: also an identification unit 21 (schematically shown for example in FIGS. 2 and 3) which is configured to estimate a quantity correlated with the density of the fuel mixture, in order to assess the type of fuel mixture (in particular at least the type of the at least one first fuel comprised in the fuel mixture); and a control assembly 22 (shown in FIG. 3) which is configured to activate the fuel mixture feeding device 12 and/or the oxidizer mixture feeding device 13 (i.e. to vary the activation of the adjustment valve 15 and/or of the adjustment valve 17) depending on the temperature detected by the detection device 11, and to adjust the activation (at least) of the oxidizer feeding device 13 depending on the type of fuel mixture assessed by the identification unit 21 and on the fuel mixture flow rate and the oxidizer flow rate mixture estimated by the flow rate measuring devices 19 and 20.

According to some embodiments not shown, the flow rate measuring device 19 comprises (in particular, consists of) a respective calibrated flange (not shown), said calibrated flange is arranged and configured to estimate a first flow value of the fuel mixture; and the control assembly 22 is configured to correct the first flow value depending on the type of fuel mixture, so as to obtain the flow rate of the fuel mixture on the basis of which to adjust, as mentioned above, the activation (at least) of the oxidizer feeding device 13, in particular (at least) of the valve 17.

In particular, as schematically represented in FIG. 3, the control assembly 22 is connected to the adjustment valves 15 and 17 and is configured to activate (i.e. to vary the activation, or to open appropriately) the valves 15 and/or 17 themselves so as to initially vary the flow rate of the fuel mixture and of the oxidizer to be fed to the burner 4, respectively, through the fuel mixture feeding duct 14 and the oxidizer mixture feeding duct 16 depending on the temperature detected inside the firing chamber 7, and then to activate (to open appropriately) the valve 17 depending on the type of fuel mixture assessed by the identification unit 21 and on the fuel mixture and oxidizer flow rate that are fed to the burner 4.

Advantageously, but not necessarily, the adjustment valves 15 and 17 are arranged, respectively, along the fuel mixture feeding duct 14 and along the oxidizer mixture feeding duct 16 so that when they are activated they partialize the section, respectively, of the ducts 14 and 16, thus varying the flow rate of the fuel mixture and of the oxidizer that passes through the ducts 14 or 16 and therefore the maximum flow rate of the fuel mixture and of the oxidizer that is fed to the burner 4 (or to the assembly 10 of burners 4) located downstream, respectively, of the adjustment valve 15 or 17.

According to other embodiments, the control assembly 22 may also be configured to adjust the activation also of the fuel mixture feeding device 12 (thus of the adjustment valve 17) depending on the type of fuel mixture (i.e., on the type and quantity of fuels that make up the fuel mixture) assessed by the identification unit 21 and on the flow rate of the fuel mixture and the flow rate of the oxidizer estimated by the flow rate measuring devices 19 and 20. It is to be understood that, according to other embodiments, the control assembly 22 could also be configured to adjust only the activation of the fuel mixture feeding device 12 (thus of the adjustment valve 15) depending on the type of fuel mixture (i.e. on the type and quantity of fuels that make up said fuel mixture) assessed by the identification unit 21 and on the flow rate of the fuel mixture and the flow rate of the oxidizer estimated by the flow rate measuring devices 19 and 20.

According to some not limiting embodiments, the control assembly 22 is configured (programmed) to activate the feeding device 12 and/or the feeding device 13 (and in particular the adjustment valve 15 and/or the adjustment valve 17) depending on the temperature detected by the detection device 11 inside the firing chamber 7, so as to ensure that the firing temperature is within a given range (thus, in particular, as close as possible to the optimal temperature).

Alternatively or in combination, advantageously but not in a limiting way, the control assembly 22 is further configured (programmed) to activate at least the feeding device 13 (and in particular at least the adjustment valve 17) depending on the type of fuel mixture and of the flow rate of the fuel or oxidizer mixture so as to maintain the volume ratio between the oxidizer and the fuel mixture within a given range (based on the type of fuel mixture).

In particular, the control assembly 22 is configured (programmed) to keep the firing temperature always comprised between 500° C. and 1400° C., in particular, between 900° C. and 1300° C., and even more particularly between 1000° C. and 1250° C. It is understood that the optimal firing temperature, i.e. the target temperature to be obtained and kept inside the firing chamber 7, may vary depending on the type of base ceramic article BC, the firing steps, the filling conditions of the kiln 1 etc.

Similarly, the optimal volume ratio (i.e. the weight ratio) between the oxidizer and the fuel mixture may vary depending on several factors, such as the type of base ceramic article BC, the firing steps, the filling conditions of the kiln 1 etc.; for example, a different volume ratio between the oxidizer and the fuel mixture (and therefore a greater or lesser presence of oxygen in the firing chamber 7) may change, at the end of firing, the colour of the final ceramic product PC.

Further, the optimal volume ratio between the oxidizer and the fuel mixture may vary (primarily) depending on the type of fuel mixture. For example, for a fuel mixture comprising (consisting substantially only of) methane gas the volume ratio of oxidizer to fuel mixture is equal to about 1:10, more advantageously about 1:9.5; whereas for a fuel mixture comprising (consisting substantially only of) hydrogen the volume ratio of oxidizer to fuel mixture is equal to about 1:3; more advantageously about 1:2.4; yet for a fuel mixture comprising (consisting substantially only of) butane the volume ratio of oxidizer to fuel mixture is equal to about 1:35, more advantageously about 1:31; for a fuel mixture comprising (consisting substantially only of) propane the volume ratio of oxidizer to fuel mixture is equal to about 1:30, more advantageously about 1:24; whereas for a fuel mixture comprising about 50% by weight of methane gas and about 50% by weight of hydrogen the volume ratio of oxidizer to fuel mixture is equal to about 1:6.

In this regard, according to some preferred but not limiting embodiments, the fuel mixture comprises (in particular, consists of) at least one between hydrogen and methane gas; in other words, the aforementioned at least one first fuel comprises (consists of) one between methane gas and hydrogen. In particular, advantageously but not in a limiting way, the fuel mixture comprises (in particular, consists of) methane gas and hydrogen; still more particularly, the fuel mixture comprises up to about 60%, in particular up to about 50% hydrogen.

It is understood that the fuel mixture may consists of any number of fuels.

According to some advantageous but not limiting embodiments (such as the one schematically shown in FIG. 2), the kiln 1 comprises a mixing device 23 placed upstream of the fuel mixture feeding device 12 (and in fluidic connection with said fuel mixture feeding device 12); a device 24 for feeding at least one first fuel (e.g. methane gas) to feed said first fuel to the mixing device 23, which (feeding device 24) comprises (in particular, is constituted by) at least one duct 24' fluidically connected to the mixing device 23; and at least one device 25 for feeding at least one second fuel (e.g. hydrogen) configured to feed said second fuel to the mixing device 23; which (feeding device 25) comprises (in particular, is constituted by) at least one duct 25' fluidically connected to the mixing device 23.

According to some advantageous but not limiting embodiments not shown, one between (or both) the feeding devices 24, 25 could comprise a tank, advantageously in fluidic connection with the duct 24' or with the duct 25', on the opposite side to the mixing device 23, to contain the first and/or the second fuel, so as to have a continuous supply of the first and/or of the second fuel.

In detail, advantageously but not in a limiting way, said mixing device 23 (per se known and not further described herein) is configured to mix the first fuel and the second fuel to form the fuel mixture. Advantageously, the aforementioned identification unit 21 comprises a processing unit 31 (schematically shown in FIGS. 1 and 3) configured to assess the type of fuel mixture; in particular the type and the quantity of at least the first fuel and of the second fuel comprised in (forming) said fuel mixture.

According to some advantageous but not limiting embodiments, the processing unit 31 may be part of the control assembly 22 (in particular, it may be comprised in the control assembly 22).

Even more advantageously according to some not limiting embodiments (such as the one shown in FIG. 2), the identification unit 21 comprises a density measurer 26 (advantageously but not in a limiting way electric, per se known and) which is arranged downstream of the mixing device 23 (in particular, along the first feeding device 12) and is configured to estimate the density of the fuel mixture; in this case the processing unit 31 is configured to assess the type of fuel mixture depending on the density estimated by the density measurer 26. According to some advantageous but not limiting embodiments, when the fuel mixture comprises hydrogen (i.e., when the aforementioned at least one first fuel is hydrogen), the density measurer 26 may be replaced by a hydrogen measuring device (not shown) and configured to measure a quantity correlated (in particular, coincident) with the percentage of hydrogen in the fuel mixture. For example, advantageously but not in a limiting way, the hydrogen measuring device could comprise (in particular could be constituted by) a product commercially known as “H2 Scan”, per se known and not further described herein.

Even more advantageously, the identification unit 21 comprises (also) a mass flowmeter 27 (of a type known and not further described herein) which is arranged downstream of the mixing device 23 and is configured to measure the flow rate of the fuel mixture. Advantageously, the presence of the mass flowmeter 27 makes it possible to monitor the hourly energy consumption (kcal/h) of the kiln 1; in particular, the hourly fuel mixture consumption.

Alternatively, or in addition (as shown in FIG. 2), the identification unit 21 comprises a mass flowmeter 28 (of the type known and not further described here) which is arranged along the feeding device 24, and is configured to estimate the flow rate of the first fuel fed to the mixing device 23; and a further mass flowmeter 29 (of the type known and not further described herein) which is arranged along the feeding device 25 and is configured to estimate the flow rate of the second fuel fed to the mixing device 23. In this case, the processing unit 31 is configured to assess the type of fuel mixture depending on the flow rate of the first fuel and the flow rate of the second fuel measured by the mass flowmeters 28 and 29.

Advantageously, when the kiln 1 comprises both the density measurer 26 (and possibly the mass flowmeter 27) and the mass flowmeters 28 and 29, the processing unit 31 of the identification unit 21 can carry out a double check on the type of combustion mixture. In other words, in these cases, the processing unit 31 is configured to assess the type of fuel mixture both depending on the density estimated by the density measurer 26 and depending on the flow rate of the first fuel and of the second fuel measured by the mass flowmeters 28 and 29.

Furthermore, according to some advantageous but not exclusive embodiments, to further improve the control of the firing conditions, the flow rate values measured by the flow rate measuring device 19 and by the flow rate measuring device 20 are stored by the control assembly 22 within a special memory (not shown, and advantageously integrated into the processing unit 31). Advantageously, in this way it will be possible to reproduce the same firing conditions several times, simply by selecting, through the control assembly 22, the desired firing conditions from those stored. In this way it is possible to fire the base ceramic articles BC at different times under the same conditions, thus obtaining the same results, that is to say final ceramic products PC with substantially identical characteristics even if made during different production cycles.

Advantageously but not exclusively, both flow rate measuring devices 19 and 20 comprise (consist of) a respective calibrated flange. Alternatively or in combination, the flow rate measuring devices 19 and 20 comprise (are constituted by) a sensor configured to measure the flow rate of the fuel mixture (i.e. the aforementioned first flow value of the fuel mixture) or of the oxidizer passing through the fuel mixture or oxidizer feeding duct 14 or 16.

In accordance with a not shown and not limiting variant of the invention, the flow rate measuring devices 19 and 20 are replaced by pressure measuring devices configured to detect the pressure of the fuel mixture (i.e. the aforementioned first flow rate value of the fuel mixture) or of the oxidizer passing through the fuel mixture or oxidizer feeding duct 14 or 16. In this case, the control assembly 22 is configured (programmed) to obtain the flow rate of the fuel mixture or of the oxidizer from the obtained pressure value, or it is programmed to activate the adjustment valve 17 depending on the pressure value measured by the pressure measuring devices.

In a further advantageous but not limiting embodiment of the invention, the kiln 1 comprises a detection device 30 configured to detect the oxygen concentration inside the firing chamber 7. In this case, advantageously but not in a limiting way, the control assembly 22 is configured to adjust the feeding device 12 and/or the feeding device 13 (and in particular the adjustment valve 15 and/or the adjustment valve 17) also depending on the oxygen concentration detected so as to keep the oxygen concentration in the firing chamber 7 within a given range. This makes it possible to change the quantity (flow rate) of the fuel mixture and/or of the oxidizer to be fed to the burner 4 (or to each assembly 10 of burners 4) taking into account the (real) quantity (flow rate) of oxygen present in the firing chamber 7, therefore for example also considering the possible flows of the oxidizer that are directed from the cooling zone R (and/or from the input station 8 and/or from the output station 9) towards the firing chamber 7 of the kiln 1. Therefore, advantageously but not necessarily, the oxygen concentration value can also be used (if necessary) to adjust (thus vary the opening of) the adjustment valve 15 and, alternatively or in combination, the adjustment valve 17 so as to optimize combustion, i.e. to vary the volume ratio between oxidizer (oxygen) and fuel mixture.

In accordance with some not limiting embodiments, such as the one shown in FIG. 3, the kiln 1 further comprises a user interface UI, which can be integrated with the control assembly 22 when this comprises (in particular is) a computer or tablet etc., as in the case shown in FIG. 3, or can be a separate entity connected to the control assembly 22. In this way, the user of the kiln 1 (i.e. a more or less experienced operator) will be able to easily control, through the user interface UI, the control assembly 22, which in turn activates (controls) the feeding devices 12 and 13, in particular the adjustment valves 15 and/or 17, so as to modify the quantity (flow rate) of the fuel mixture and/or of the oxidizer as the base ceramic articles BC to be treated vary, or of the assembly 10 of burners 4 etc.

According to a further aspect of the present invention, there is provided a method for the firing of base ceramic articles BC (e.g. such as those described above with reference to the kiln 1) so as to obtain final ceramic products PC (in particular, ceramic slabs; more particularly, tiles), by firing substantially flat base ceramic articles BC obtained starting from a ceramic powder (a semi-dry mixture, in particular having a humidity ranging from 5% to 7%) having less than 50% (in particular, less than 30%) by weight, with respect to the total weight of the base ceramic articles BC, made of alumina.

More precisely, the method for the firing of base ceramic articles BC comprises: a conveying step, during which the base ceramic articles BC are conveyed along the given path P described above, in particular from the aforementioned input station 8 to the aforementioned output station 9 through the firing chamber 7; a first feeding step, during which a fuel mixture (of the type described above), comprising at least one first fuel, is fed to (towards) the burner 4 (or to the at least one assembly 10 of burners 4), a second feeding step, during which an oxidizer is fed to the (towards) burner 4 (or to the at least one assembly 10 of burners 4); and a combustion step, during which the combustion mixture (in particular obtained from the fuel mixture and oxidizer fed to the burner 4) is burned in the burner 4 itself. The combustion heat is transferred to the firing chamber 7 of the kiln 1 so as to fire the base ceramic articles BC while the base ceramic articles BC themselves are (are conveyed by the conveyor device 5) inside the firing chamber 7 during a firing step which is (at least partially) simultaneous with (and/or subsequent to) the combustion step.

The method further comprises an (initial) adjustment step, during which the quantity (flow rate) of the fuel mixture and/or of the oxidizer fed to the burner 4 (or to each assembly 10 of burners 4) is adjusted depending on a temperature detected inside the firing chamber 7, in particular at the aforementioned firing zone C. In detail, advantageously, the method comprises (also) a detection step, at least partially prior to said first adjustment step, during which a detection device 11 of the type described above detects the temperature inside the firing chamber 7.

Advantageously but not in a limiting way, as mentioned above in relation to the kiln 1, during this (initial) adjustment step, the flow rate of the fuel mixture and/or of the oxidizer fed to the burner 4 (or to each assembly 10 of burners 4) is adjusted so as to keep the temperature inside the firing chamber 7 in a given range, for example ranging from at least about 500° C. to at most about 1400° C., as better explained above.

Advantageously but not necessarily, this (initial) adjustment step is at least partially simultaneous with the firing step and with the combustion step.

The method further comprises a step of measuring the flow rate of the fuel mixture and a step of measuring the flow rate of the oxidizer, during which the aforementioned flow rate measuring devices 19 and 20 estimate (and/or measure and/or detect), respectively, the flow rate of the fuel mixture and the flow rate of the oxidizer fed to the burner 4 (or to each assembly 10 of burners 4), in particular following the above-described adjustment step (initial, i.e. the adjustment made depending on the temperature detected in the firing chamber 7).

The method further comprises a fuel mixture identification step, during which an identification unit 21 (advantageously of the type described above) estimates a quantity correlated to the density of the fuel mixture in order to assess the type of fuel mixture (in particular at least the type of the at least one first fuel comprised in the fuel mixture; even more particularly the type and the quantity of at least the first and second fuel).

Preferably but not in a limiting way, the step of measuring the flow rate of the fuel mixture comprises a sub-step of measuring the flow rate of the fuel mixture, during which the flow rate measuring device 19 estimates a first value of the flow rate of the fuel mixture fed to the burner 4 (or to each assembly 10 of burners 4); and a sub-correction step, which is at least subsequent to the fuel mixture identification step, during which the first flow value, estimated by the flow rate measuring device 19 during said sub-step of measuring the flow rate of the fuel mixture is corrected depending on the type of fuel mixture, so as to obtain said flow rate of the fuel mixture fed to the burner 4 (or to each assembly 10 of burners 4).

The method further comprises a further adjustment step, during which the quantity (flow rate) of the oxidizer fed to the same burner 4 (or to each assembly 10 of burners 4) is adjusted (at least) depending on the type of fuel mixture estimated during the identification step, and depending on the flow rate of the fuel mixture and of the oxidizer.

As already explained above with reference to the kiln 1, during this further adjustment step, the flow rate of the fuel mixture fed to the same burner 4 (or to each assembly 10 of burners 4) could also be adjusted always depending on the type of fuel mixture estimated during the identification step, and depending on the flow rate of the fuel mixture and of the oxidizer estimated during the aforementioned flow rate measurement steps.

Advantageously but not in a limiting way, the flow rate of the oxidizer (in particular, also of the fuel mixture) fed to the burner 4 (or to each assembly 10 of burners 4) is adjusted (varied) so as to keep the volume ratio between the oxidizer and the fuel mixture within a first range determined based on the type of fuel mixture, e.g. varying from about 1:2 to about 1:10 as explained in greater detail above in relation to the kiln 1.

In other words, the method of the invention therefore allows, depending on the type of fuel mixture, the type of base ceramic article BC to be treated, the different firing steps (in particular the different zones of the firing chamber 7), the filling conditions of the kiln 1 etc., to reach and keep (by varying at least the flow rate of the oxidizer) the desired fuel mixture/oxidizer ratio value (within the given range), so as to fire the base ceramic articles BC always under optimal conditions also in terms of consumptions.

In accordance with a preferred but not limiting embodiment, the method also comprises a fuel mixture forming step, which is prior to the first feeding step and which comprises: a third feeding step, during which at least one first fuel (e.g. methane gas as mentioned above with reference to the kiln 1) is fed to a mixing device 23 (of the type described above); at least one fourth feeding step, during which at least one second fuel (e.g. hydrogen as mentioned above with reference to the kiln 1) is fed to the mixing device 23; and a mixing step, during which the mixing device 23 mixes the first fuel and the second fuel to form the fuel mixture.

With regard to the type of fuel mixture, the considerations set out above with reference to the kiln 1 remain valid.

Advantageously but not necessarily, the fuel mixture identification step is at least partially subsequent to said fuel mixture forming step and at least partially simultaneous with the first step of feeding and comprises: a sub-step of measuring the density of the fuel mixture, during which a density measurer 26 estimates the density of the fuel mixture formed during the forming step (in particular, during the mixing step); and a first identification sub-step, during which the type of fuel mixture is identified (in particular, the quantity and the type of the first fuel and at least the quantity and the type of the second fuel) depending on the density of the fuel mixture estimated during said sub-step of measuring the density of the fuel mixture. Advantageously but not in a limiting way, during this sub-step of measuring the density of the fuel mixture, a mass flowmeter 27 estimates the flow rate of the fuel mixture formed during the forming step (in particular, during the mixing step) and during the first identification sub-step the type of fuel mixture is also identified depending on the flow rate of the fuel mixture estimated during the sub-step of measuring the density of the fuel mixture.

Alternatively or in addition, the fuel mixture identification step comprises: a sub-step of measuring the flow rate at least of the first and of the third fuel that is at least prior to the mixing step (and simultaneous with the third and fourth feeding step) and during which a mass flowmeter 28 estimates the flow rate of the first fuel fed during the third feeding step and a mass flowmeter 29 estimates the flow rate of the second fuel fed during the fourth feeding step; and a second identification sub-step, during which the type of fuel mixture (in particular, the quantity and the type of the first fuel and the quantity and the type of the second fuel) is identified depending on the density of the fuel mixture estimated during the sub-step of measuring the flow rate of at least the first and third fuel.

As already said in relation to the kiln 1, the method may comprise a step of detecting the oxygen concentration, during which the oxygen concentration is detected inside said firing chamber 7 so as to obtain a detected concentration to be used during the adjustment steps to vary depending on this detected concentration the volume ratio between the oxidizer and the fuel mixture that are fed to the burner 4 (or to each assembly 10 of burners 4), so as to keep the oxygen concentration within a given range.

It is understood that the fuel mixture could consist of any number of fuels, in this case a number of fuel feeding devices (similar to the devices 24 and 25 described above) and a number of fuel feeding steps equal to the number of fuels to feed the various fuels to the mixing device 23 would be provided. And possibly the aforementioned sub-step of flow rate measurement of at least the first and third fuel would be extended to the number of fuels by providing an adequate number of mass flowmeters.

The provisions of the present invention have different advantages with respect to the state of the art. These include the following.

First of all, also as the type of the fuel mixture varies, it is possible to precisely, simply, quickly and effectively adjust the quantity (flow rate) of the fuel mixture and of the oxidizer fed to each burner 4 (or to each assembly 10 of burners 4), depending on the different conditions (different types of base ceramic articles BC, different firing steps, etc.) so that the volume ratio between the oxidizer and the fuel mixture adapts to the different conditions in order to obtain an optimal firing, or in any case in order to have a total control over the firing conditions of the base ceramic articles BC.

In addition, an almost instantaneous adjustment of the quantity (flow rate) of the fuel mixture and/or of the oxidizer to be fed to the burner 4 (or to each assembly 10 of burners 4) can be obtained. This makes it possible to quickly switch from one firing cycle (or from certain firing conditions) to another without the production downtimes necessary to carry out the manual adjustment operations, with considerable advantages in terms of times and therefore production costs. This is particularly useful, for example, when the type of fuel mixture varies over time, for example as the availability of the fuels that compose it varies and/or the pressure with which such fuels arrive at the mixing device 23 vary.

In addition, the possibility of storing the flow rate values of the fuel mixture and of the oxidizer allows the different firing cycles to be digitized and the firing cycles to be repeated at different times.

Furthermore, it is possible to make different adjustments of the various assemblies 10 of burners 4 and thus to heat the different zones of the firing chamber 7 to different temperatures, as each control assembly 10 is connected to respective fuel mixture and oxidizer feeding devices 12 and 13. This allows, advantageously, for example, to feed also different types of fuel mixtures to the various assemblies 10 of burners 4, for example depending on the availability of each fuel making up the fuel mixture but also depending on the different conditions (different types of base ceramic articles BC, different firing steps, etc.) to be obtained in the various zones of the kiln.

The method and the kiln 1 of the present invention also make it possible to ensure, under any operating condition, the correct supply of oxidizer, in particular of air, to the various assemblies 10 of burners 4, regardless of the required thermal power (fuel flow rate) and of the type of fuel mixture.

We claim:

1. A method for the firing of substantially flat base ceramic articles (BC); the method comprises:

- at least one conveying step, during which the base ceramic articles (BC) are conveyed along a given path (P), which extends from an input station to an output station through a firing chamber of a kiln;
- a first feeding step, during which a fuel mixture, which comprises at least one first fuel, is fed towards at least one burner;
- a second feeding step, during which an oxidizer is fed towards said at least one burner;
- a combustion step, during which a combustion mixture comprising said fuel mixture and the oxidizer is burnt in said burner;
- at least one firing step, which is at least partially simultaneous with the combustion step and during which said at least one burner heats said firing chamber so as to fire the base ceramic articles (BC) inside the firing chamber and obtain ceramic products (PC);
- a detection step, during which a detection device detects the temperature inside the firing chamber;
- at least one first adjustment step, which is at least partially simultaneous with the combustion step and during which the fuel mixture flow rate and/or the oxidizer flow rate fed to said at least one burner during the first and/or the second feeding step is adjusted depending on the temperature detected inside the firing chamber during said detection step;
- a fuel mixture identification step, during which an identification unit estimates a quantity correlated with the density of the fuel mixture in order to assess the type of fuel mixture (in particular, at least the type of said at least one first fuel comprised in said fuel mixture);
- a first flow rate measuring step, during which a first flow rate measuring device estimates a fuel mixture flow rate fed to said at least one burner during the first feeding step;
- a second flow rate measuring step, during which a second flow rate measuring device estimates an oxidizer flow rate fed to said at least one burner during the second feeding step;
- at least one second adjustment step, during which the oxidizer flow rate fed to said at least one burner during the second feeding step is adjusted depending on the type of fuel mixture estimated during said fuel mixture identification step and depending on the fuel mixture flow rate estimated during the first flow rate measuring step and on the oxidizer flow rate estimated during said at least one second measuring step.

2. The method according to claim 1, wherein said first flow rate measuring step comprises:

a first measuring sub-step, during which said first flow rate measuring device estimates a first value of the fuel mixture flow rate fed to said at least one burner during the first feeding step; and a correction sub-step, which is subsequent at least to said fuel mixture identification step and during which the first flow rate value estimated by said first flow rate measuring device during said first measuring sub-step is corrected depending on the type of fuel mixture assessed by said identification unit during said fuel mixture identification step in order to obtain said fuel mixture flow rate.

3. The method according to claim 1, further comprising:

a fuel mixture forming step, which is prior to said first feeding step, and further comprises:

a third feeding step, during which said at least one first fuel is fed to a mixing device; and at least one fourth feeding step, during which at least one second fuel is fed to said mixing device; and a mixing step, during which said mixing device mixes said at least one first fuel and said at least one second fuel in order to form said fuel mixture.

4. The method according to claim 2, wherein said fuel mixture identification step is at least partially subsequent to said fuel mixture forming step and at least partially simultaneous with said first feeding step and comprises:

a second measuring sub-step, during which a first density measurer estimates the density of the fuel mixture formed during the fuel mixture forming step (in particular, during the mixing step); and a first identification sub-step, during which the type of fuel mixture is identified (in particular, the quantity and the type of the first fuel as well as the quantity and the type of the second fuel are identified) depending on the density of the fuel mixture estimated during said second measuring sub-step; and in particular, during said second measuring sub-step, a first mass flowmeter estimates the flow rate of the fuel mixture formed during the fuel mixture forming step (in particular, during the mixing step) and during said first identification sub-step.

5. The method according to claim 3, wherein said fuel mixture identification step comprises:

a third measuring sub-step, which is prior at least to said mixing step and during which a second mass flowmeter estimates the flow rate of the first fuel fed during said third feeding step and a third mass flowmeter estimates the flow rate of said at least one second fuel fed during said fourth feeding step; and a second identification sub-step, during which the type of fuel mixture is identified (in particular, the quantity and the type of the first fuel as well as the quantity and the type of the second fuel are identified) depending on the density of the fuel mixture estimated during said third measuring sub-step.

6. The method according to claim 1, wherein, during the second adjustment step, the oxidizer flow rate fed to said at least one burner is adjusted (changed) so as to keep the volume ratio between the oxidizer and the fuel mixture within a first range determined based on the type of fuel mixture.

7. The method according to claim 1, wherein, during the first adjustment step, the flow rate of the fuel mixture and/or of the oxidizer fed to said at least one burner is adjusted so as to keep the temperature inside the firing chamber within a second given range.

8. The method according to claim 1, wherein:

said at least one first fuel is either hydrogen or methane gas;

in particular, said first fuel and said second fuel are hydrogen and methane, respectively.

9. A kiln for the firing of base ceramic articles (BC), said kiln comprising:

at least one firing chamber;

a conveyor device to convey the base ceramic articles (BC) along a given path (P), which extends through the firing chamber from an input station to an output station;

at least one burner, which is configured to burn a combustion mixture in order to heat the firing chamber so as to fire the base ceramic articles (BC) going through the firing chamber and obtain ceramic products (PC);

a first feeding device, which is configured to feed a fuel mixture, which comprises at least one first fuel, towards said at least one burner;

a second feeding device to feed an oxidizer towards said at least one burner so as to form, together with the fuel mixture, said combustion mixture;

at least one detection device, which is configured to detect the temperature inside the firing chamber;

a first flow rate measuring device, which is configured to estimate the fuel mixture flow rate fed to said at least one burner by the first feeding device;

a second flow rate measuring device, which is configured to estimate the oxidizer flow rate fed to said at least one burner by the second feeding device;

an identification unit, which is configured to estimate a quantity correlated with the density of the fuel mixture in order to assess the type of fuel mixture, in particular at least the type of said at least one first fuel comprised in said fuel mixture;

at least one control assembly, which is configured to activate said first feeding device and/or said second feeding device depending on the temperature detected by the detection device and to adjust the activation of said second feeding device depending on the type of fuel mixture assessed by said identification unit and on the fuel mixture flow rate as well as on the oxidizer flow rate estimated by the first flow rate measuring device and by the second flow rate measuring device.

10. The kiln according to claim 9, wherein:

said first flow rate measuring device comprises (in particular, consists of) a respective calibrated flange, said calibrated flange being arranged and configured so as to estimate a first fuel mixture flow rate value; and said control assembly is configured to correct said first fuel mixture flow rate value depending on the type of fuel mixture, so as to obtain said fuel mixture flow rate.

11. The kiln according to claim 9, and further comprising:

a mixing device arranged upstream of the first feeding device;

a third feeding device to feed said at least one first fuel to said mixing device; and at least one fourth feeding device to feed at least one second fuel to said mixing device; said mixing device being configured to mix said at least one first fuel and said at least one second fuel so as to form said fuel mixture;

wherein: said identification unit comprises a processing unit, which is configured to assess the type of fuel mixture, in particular, the type and the quantity at least of said first fuel and second fuel comprised in (forming) said fuel mixture.

12. The kiln according to claim 11, wherein:

said identification unit comprises a first density measurer, which is arranged downstream of the mixing device (in particular, along said first feeding device) and is configured to estimate the density of the fuel mixture;

said processing unit being configured to assess the type of fuel mixture depending on the density estimated by said first density measurer;

in particular, said identification unit also comprises a first mass flowmeter, which is arranged downstream of the mixing device (in particular, along said first feeding device) and is configured to measure the fuel mixture flow rate, and said processing unit is configured to assess the type of fuel mixture also depending on the fuel mixture flow rate.

13. The kiln according to claim 11, wherein:

said identification unit comprises a second mass flowmeter, which is arranged along said third feeding device and is configured to estimate the flow rate of said at least one first fuel fed to said mixing device; and at least one third mass flowmeter, which is arranged along said fourth feeding device and is configured to estimate the flow rate of said at least one second fuel fed to said mixing device;

said processing unit being configured to assess the type of fuel mixture depending on the flow rate of said at least one first fuel and on the flow rate of said at least one second fuel measured by the second mass flowmeter and by the third mass flowmeter, respectively.

14. The kiln according to claim 9, wherein:

the first feeding device comprises a fuel mixture feeding duct to feed the fuel mixture to said at least one burner and a first adjustment valve to adjust the flow rate of the fuel mixture along the fuel mixture feeding duct;

the first flow rate measurer is arranged along the fuel mixture feeding duct upstream of said at least one burner;

the second feeding device comprising an oxidizer feeding duct to feed the oxidizer to said at least one burner and a second adjustment valve to adjust the flow rate of the oxidizer along the oxidizer feeding duct;

the second flow rate measuring device is arranged along the oxidizer feeding duct upstream of said at least one burner;

the control assembly is configured to activate the first adjustment valve and/or the second adjustment valve depending on the temperature detected by the first detection device and to adjust the second adjustment valve depending on the type of fuel mixture assessed by the identification unit, on the fuel mixture flow rate measured by the first flow rate measuring device and on the oxidizer flow rate measured by the second flow rate measuring device.

15. The kiln according to claim 9, wherein:

the control assembly is configured to adjust at least the second feeding device (in particular, at least the second adjustment valve) so as to keep the volume ratio between the oxidizer and the fuel mixture within a first range determined based on the type of fuel mixture;

in particular, the control assembly is configured to adjust at least the first feeding device and/or the second feeding device (in particular, the first adjustment valve and/or the second adjustment valve) so as to keep the temperature inside the firing chamber within a second given range.

16. The kiln according to claim 9, wherein:

said at least one first fuel is either hydrogen or methane gas;

in particular, said first fuel and said second fuel are hydrogen and methane gas, respectively.

* * * * *